United States Patent [19]
Meulenkamp

[11] Patent Number: 5,957,268
[45] Date of Patent: Sep. 28, 1999

[54] CONVEYOR BELT

[75] Inventor: Hennie H. J. Meulenkamp, Hengelo, Netherlands

[73] Assignee: B.V. Metaalgaasweverij Twente, Hengelo, Netherlands

[21] Appl. No.: 08/945,651

[22] PCT Filed: Apr. 26, 1996

[86] PCT No.: PCT/NL96/00185

§ 371 Date: Jan. 12, 1998

§ 102(e) Date: Jan. 12, 1998

[87] PCT Pub. No.: WO96/33931

PCT Pub. Date: Oct. 31, 1996

[30] Foreign Application Priority Data

Apr. 27, 1995 [NL] Netherlands ............................ 1000241

[51] Int. Cl.⁶ .................................................. B65G 17/06
[52] U.S. Cl. .......................................... 198/850; 198/851
[58] Field of Search .................................... 198/841, 778, 198/850, 851, 853

[56] References Cited

U.S. PATENT DOCUMENTS

| | | | |
|---|---|---|---|
| 2,907,449 | 10/1959 | Contreras | 198/853 X |
| 4,080,842 | 3/1978 | Lapeyre et al. | 74/251 |
| 4,325,478 | 4/1982 | Richard | 198/850 X |
| 4,953,693 | 9/1990 | Draebel | 198/851 X |

FOREIGN PATENT DOCUMENTS

| | | |
|---|---|---|
| 1597154 | 6/1970 | France . |
| 2692562 | 12/1993 | France . |

*Primary Examiner*—James R. Bidwell
*Attorney, Agent, or Firm*—Webb Ziesenheim Logsdon Orkin & Hanson, P.C.

[57] ABSTRACT

The invention relates to a conveyor belt comprising a plurality of link elements which are mutually coupled in pairs by means of a hinge, which hinge comprises at least one hinge pin present on the one link element and extending transversely of the longitudinal direction of the conveyor belt and a plurality of correspondingly registered eyes present on the other link element and engaging round said at least one hinge pin such that the conveyor belt is flexible in transverse direction relative to the main plane of the conveyor belt. The conveyor belt according to the invention has at least one continuous row of slide blocks which can co-act with a slide strip forming part of a transporting device.

9 Claims, 4 Drawing Sheets

CONVEYOR BELT

BACKGROUND OF THE INVENTION

The invention relates to a conveyor belt comprising a plurality of link elements which are mutually coupled in pairs by means of a hinge, which hinge comprises at least one hinge pin present on the one link element and extending transversely of the longitudinal direction of the conveyor belt and a plurality of correspondingly registered eyes present on the other link element and engaging round said hinge pin(s) such that the conveyor belt is flexible in transverse direction relative to the main plane of the conveyor belt.

Such a Conveyor belt is known from FR-A-15 97 154. The known conveyor belt comprises link elements, all having a plurality of eyes located on opposite sides thereof, which link elements are mutually coupled in pairs by means of hinge pins extending in transverse direction of the conveyor belt through the eyes of neighbouring link elements.

Relative to this known art the conveyor belt according to the invention has the feature each link element comprises a least one slide block, in the end zones of which slide block are arranged continuous holes for passage of respective hinge pins, wherein the end zones of adjacent slide blocks are interwoven in the longitudinal direction of the associated hinge pin, which slide blocks are arranged to co-act with a slide strip forming part of a transporting device.

SUMMARY OF THE INVENTION

The conveyor belt according to the invention thus has at least one continuous row of slide blocks which can co-act with a slide strip forming part of a transporting device Particularly in an embodiment intended for transporting products through a thermal treatment station, for instance a furnace or freezer area, the embodiment is recommended in which a slide block consists substantially of a material with a temperature resistance satisfying a chosen norm. A slide block can for instance consist of steel, for instance stainless steel.

A specific embodiment has the special feature that a slide block consists of a wear-resistant plastic.

A very suitable material in this respect is a nylon.

The invention is also very suitable for forming longitudinal partitions. For this purpose the conveyor belt can have the special feature that a slide block supports a plate extending transversely of the main plane of the conveyor belt.

The slide blocks can be connected to the rest of the conveyor belt with very simple mechanical means. A specific embodiment has the special feature that a block is coupled to a hinge pin by means of a key.

The most inexpensive and simple embodiment from the point of view of production technique is that in which all blocks are identical. Attention is drawn in this respect to the fact that the interwoven parts of the end zones of adjacent slide blocks can complement each other mirror-symmetrically. Protruding slide blocks can be located on one side or on mutually opposite sides. Obtained in this embodiment is the example for all cases that only one type of product has to be manufactured and held in stock for purposes of replacement.

BRIEF DESCRIPTION OF THE DRAWINGS

The invention will now be elucidated with reference to the annexed drawings of several random embodiments. Herein.

DESCRIPTION OF THE PREFERRED EMBODIMENTS

Figure 1:
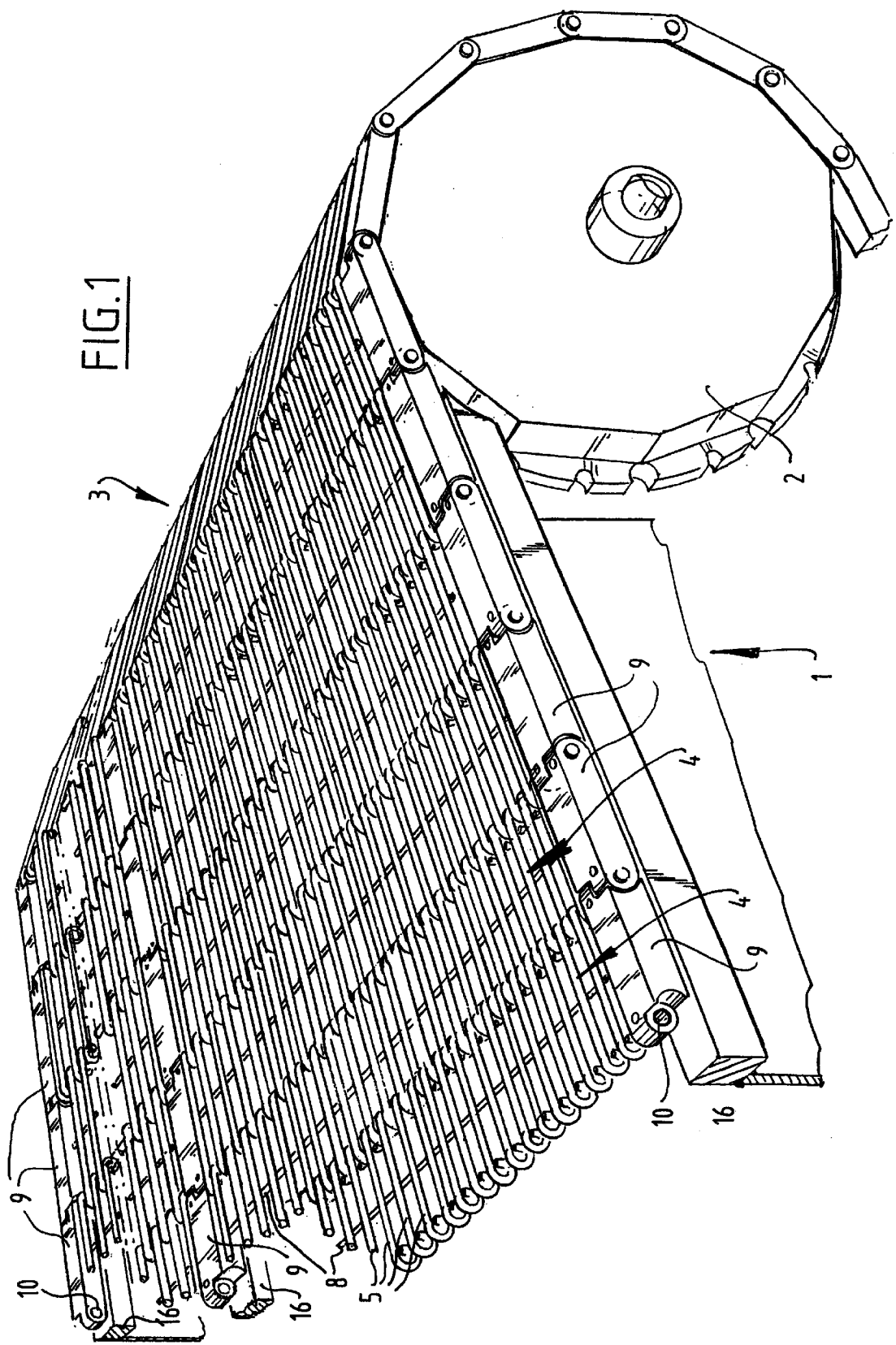
FIG. 1 shows a perspective view of a portion of the conveyor belt according to the invention.

FIG. 1 shows a transporting device 1 comprising drive wheels 2 which are drivable by means which are not shown and which co-act with a conveyor belt 3 according to the invention. Conveyor belt 3 comprises a plurality of link elements 4 which are mutually coupled in pairs by means of respective hinges. Each link element comprises a plurality of wires 5 bent into a loop shape at their ends, the loop-shaped end zones of which co-act with respective pivot shafts 7 (see also FIGS. 2 and 3). The wires 5 of each link element are mutually joined by means of a central pin 8. The loop-shaped bends 6 are in register for passage of the straight hinge pins 7.

According to the invention at least one, and in this case, three slide blocks 9 are arranged on each link element. Each slide block has an end zone in which is arranged a continuous hole 10 for passage of hinge pins 7. The end zones of adjacent slide blocks take a form such that they can be placed in mutually interwoven manner. In the drawn embodiments each end zone is embodied such that it has a cylindrical half 11 and a recess 12 complementary thereto. Adjacent slide blocks 9 can thus be mutually coupled in the manner shown by means of a hinge pin 7. Locking holes 13 extending transversely of the holes 10 are arranged in the nylon slide blocks 9. Through these locking holes 13 can be placed keys or locking pins 14 which can co-act with respective recesses 15 in hinge pins 7.

Figure 2:
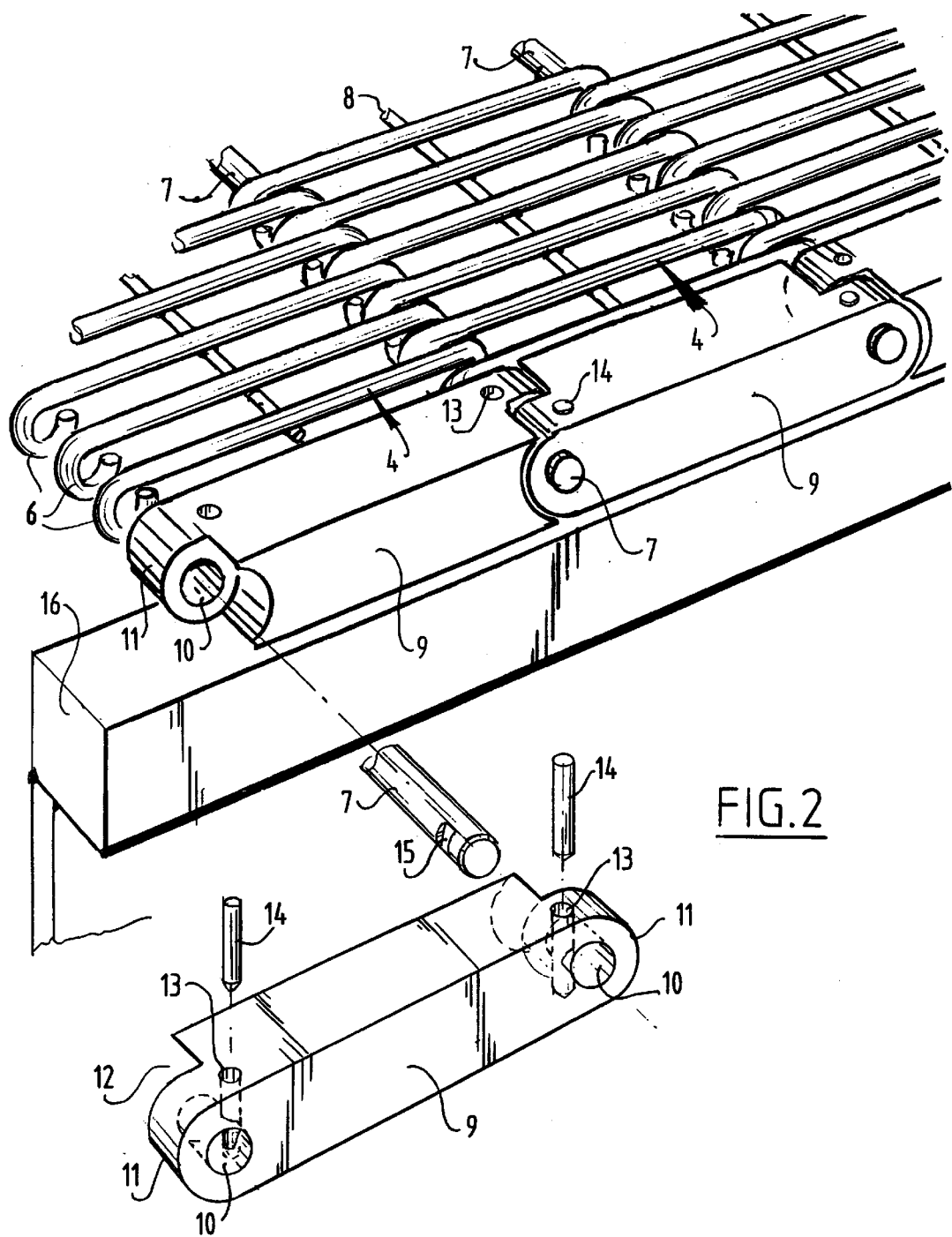
FIG. 2 shows a part of the conveyor belt according to FIG. 1 on enlarged scale and partly in exploded view.

FIG. 2 shows a slide block 9 on enlarged scale. It is apparent that the two cylindrical halves 11 are located on either side of the block on the same long side. Alternatively, a cylindrical half can also be located on the other side. For assembly and disassembly of the conveyor belt 3 the drawn embodiment has the advantage that in order to replace a slide block it is never necessary to temporarily remove more than two adjacent slide blocks.

The rows of slide blocks 9 are slidable over slide strips 16. These can be of any suitable wear-resistant material which has a relatively low coefficient of friction in common with the material of slide blocks 9.

Figure 3:
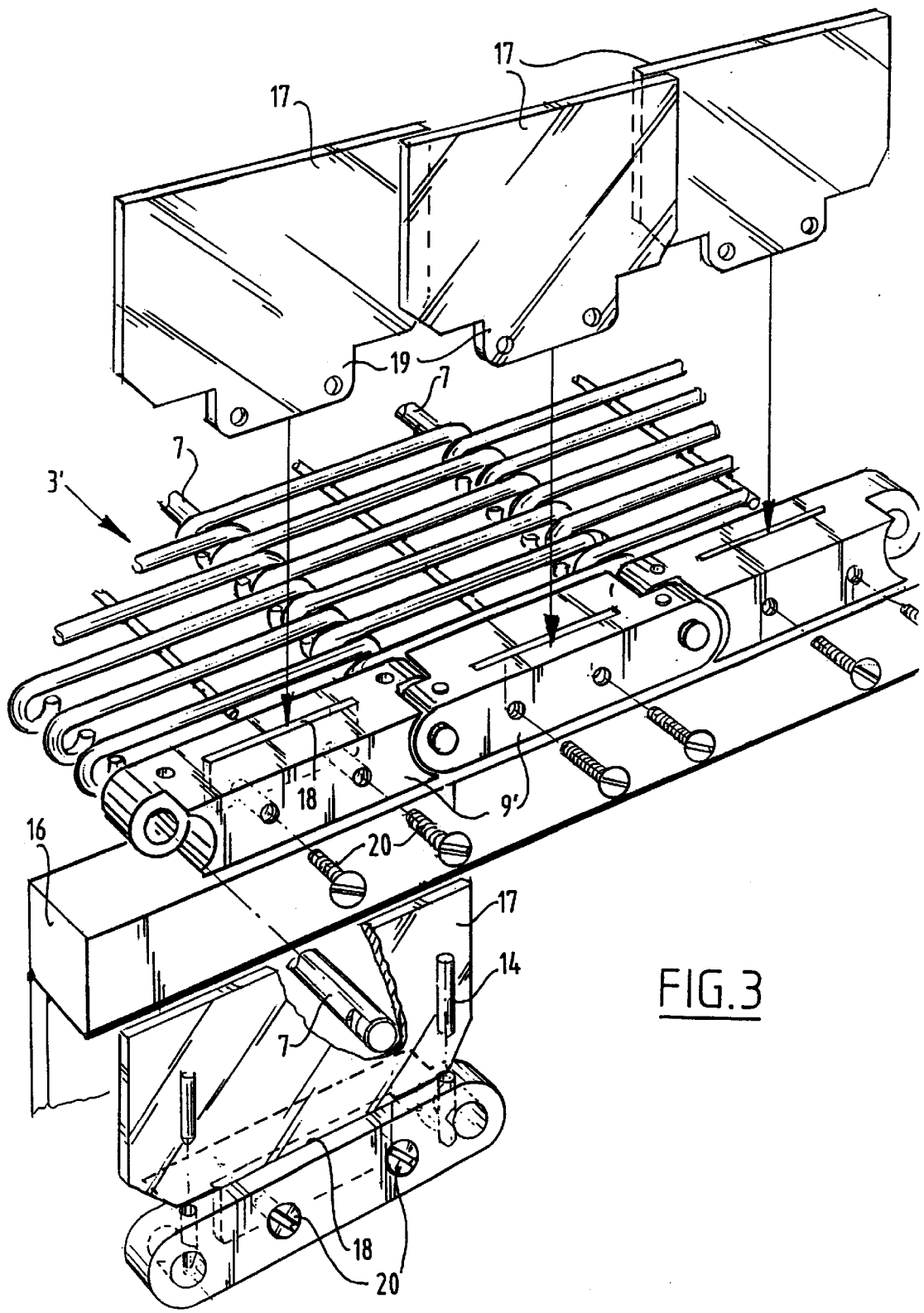
FIG. 3 shows a view corresponding with FIG. 2 of another embodiment.

In the embodiment of FIG. 3 standing plates 17 are added to each slide block 9'. For this purpose the slide blocks 9' are provided with slotted holes 18 into which fits a support part 19 of a plate 17. A plate 17 is fixed in a slide block 9' by means of screws 20.

FIG. 3 also shows clearly an additional advantage of the above described form of the slide blocks 9, in FIG. 3 9'. The slotted holes 18 are arranged a little outside the central plane of a block 9'. With alternating placing of adjacent blocks adjacent plates 17 can have an overlapping zone in common with each other while retaining the flexibility of conveyor belt 3'.

Figure 4:
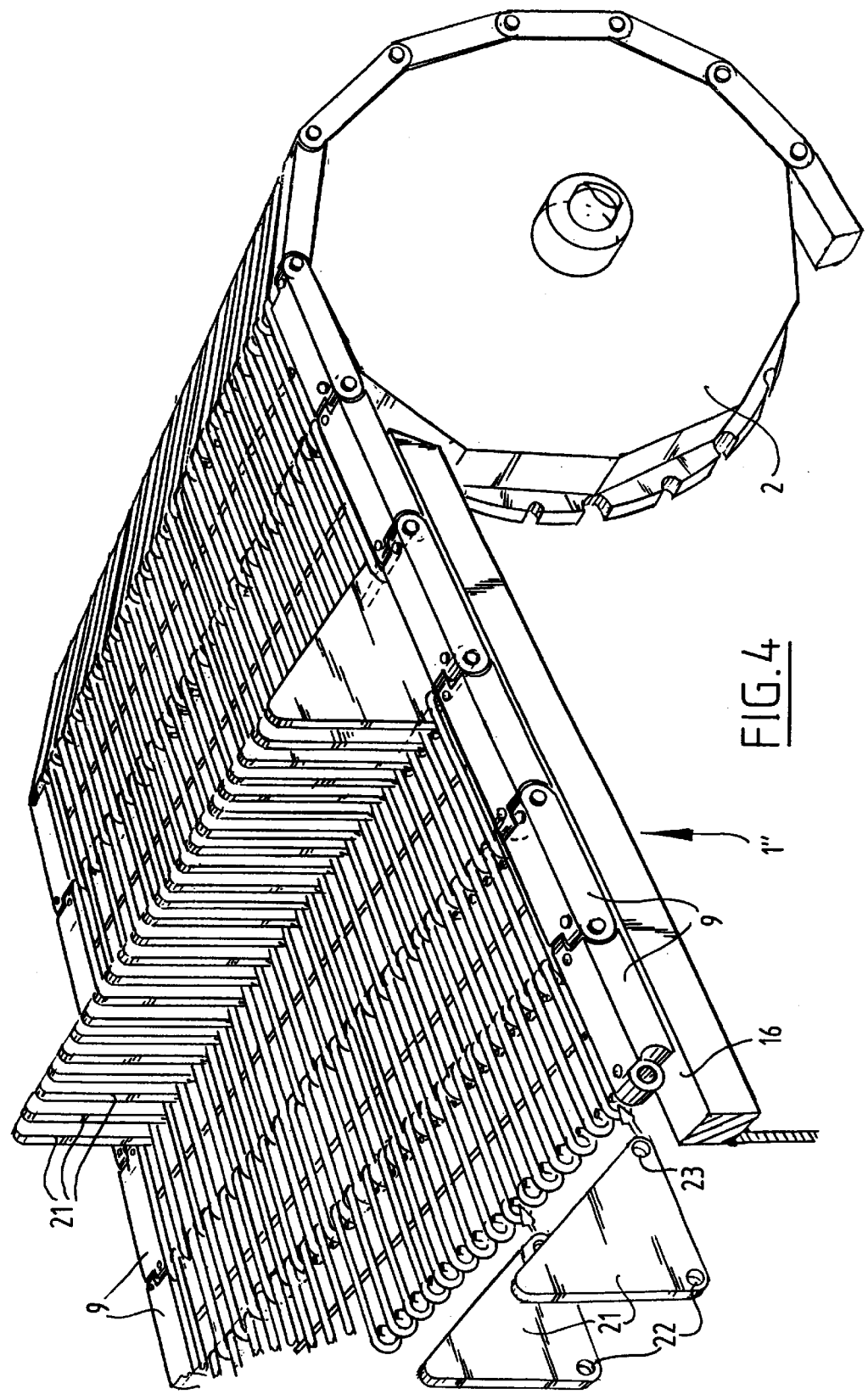
FIG. 4 shows a view corresponding with FIG. 1 of yet another embodiment.

FIG. 4 shows a transporting device 1" which comprises two rows of slide blocks 9 and which has pushing plates 21 which together form a link element. Plates 21 have continuous holes 22, 23 for co-action with the hinge pins 7.

I claim:

1. A conveyor belt comprising a plurality of link elements which are mutually coupled in pairs by means of a hinge, which hinge comprises at least one hinge pin present on the one link element and extending transversely of the longitudinal direction of the conveyor belt and a plurality of correspondingly registered eyes present on the other link element and engaging round said at least one hinge pin such that the conveyor belt is flexible in the transverse direction relative to the main plane of the conveyor belt, wherein each link element comprises at least one slide block, in the end zones of the slide block are arranged continuous holes for passage of respective hinge pins, wherein the end zones of adjacent slide blocks are interwoven in the longitudinal direction of the associated hinge pin, which slide blocks are arranged to co-act with a slide strip forming part of a transporting device.

2. The conveyor belt as claimed in claim 1, wherein a slide block consists substantially of a material with a temperature resistance satisfying a chosen norm.

3. The conveyor belt as claimed in claim 1, wherein a slide block consists substantially of steel, for instance stainless steel.

4. The conveyor belt as claimed in claim 1, wherein a slide block consists of a wear-resistant plastic.

5. The conveyor belt as claimed in claim 4, wherein a slide block consists substantially of a nylon.

6. The conveyor belt as claimed in claim 1, wherein a slide block supports a plate extending transversely of the main plane of the conveyor belt.

7. The conveyor belt as claimed in claim 1, wherein a slide block is coupled to a hinge pin by means of a key.

8. The conveyor belt as claimed in claim 1, wherein all blocks are identical.

9. The conveyor belt as claimed in claim 3, wherein the slide block consists of stainless steel.

* * * * *